(12) United States Patent
Kurasawa

(10) Patent No.: US 12,718,043 B2
(45) Date of Patent: Aug. 25, 2026

(54) PRINTING APPARATUS AND CONTROL METHOD THEREFOR

(71) Applicant: CANON KABUSHIKI KAISHA, Tokyo (JP)

(72) Inventor: Kanto Kurasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 316 days.

(21) Appl. No.: 18/511,422

(22) Filed: Nov. 16, 2023

(65) Prior Publication Data

US 2024/0169175 A1 May 23, 2024

(30) Foreign Application Priority Data

Nov. 17, 2022 (JP) ................................ 2022-184313

(51) Int. Cl.

| | |
|---|---|
| ***G06K 15/00*** | (2006.01) |
| ***B41J 11/00*** | (2006.01) |
| ***B41J 15/02*** | (2006.01) |
| ***B41J 15/04*** | (2006.01) |
| ***G06K 15/02*** | (2006.01) |
| ***G06K 15/16*** | (2006.01) |

(52) U.S. Cl.

CPC ........... *G06K 15/408* (2013.01); *B41J 11/003* (2013.01); *B41J 11/007* (2013.01); *B41J 15/02* (2013.01); *B41J 15/046* (2013.01); *B41J 15/048* (2013.01); *G06K 15/022* (2013.01); *G06K 15/16* (2013.01); *G06K 15/4065* (2013.01)

(58) Field of Classification Search

CPC .... G06K 15/408; G06K 15/022; G06K 15/16; G06K 15/4065; B41J 11/003; B41J 11/007; B41J 15/02; B41J 15/046; B41J 15/048; B41J 15/04

See application file for complete search history.

(56) References Cited

U.S. PATENT DOCUMENTS

| | | | | |
|---|---|---|---|---|
| 2002/0001006 | A1* | 1/2002 | Matsumoto | B41J 11/008 347/136 |
| 2008/0143037 | A1* | 6/2008 | Imai | B65H 1/14 271/11 |
| 2017/0106647 | A1* | 4/2017 | Inoue | B41J 25/001 |
| 2021/0072683 | A1* | 3/2021 | Yoshida | G03G 15/2042 |
| 2022/0288950 | A1* | 9/2022 | Tani | G06K 15/408 |

FOREIGN PATENT DOCUMENTS

| | | | |
|---|---|---|---|
| JP | 2006188352 | A * | 7/2006 |
| JP | 2014-028440 | A | 2/2014 |

* cited by examiner

*Primary Examiner* — Huo Long Chen
(74) *Attorney, Agent, or Firm* — Venable LLP

(57) ABSTRACT

A printing apparatus, which prints on a sheet supplied from a rolled sheet and takes up the sheet in a roll shape, includes a splice detection unit configured to detect a splice portion of the sheet, a conveyance unit configured to convey the sheet, a meandering correction unit including a sensor unit configured to detect a sheet end portion of the sheet in a width direction of the sheet on a downstream side of the splice detection unit and configured to correct meandering of the sheet based on detection of the sheet end portion by the sensor unit, and a control unit configured to control the meandering correction unit based on a relationship between a position of the splice portion and a detection area of the sensor unit.

30 Claims, 11 Drawing Sheets

10
20
11
30
12
40
49
41
13
14
PRINTING DIRECTION
15
17

300
HOST APPARATUS
100
CONTROL UNIT
101
MAIN CONTROLLER
102
HOST I/F
103
OPERATION PANEL
104
PRINT ENGINE I/F
105
RAM
106
ROM
107
IMAGE PROCESSING UNIT
200
PRINTER ENGINE UNIT
202
PRINT CONTROLLER
201
CONTROLLER I/F
203
ROM
204
RAM
205
IMAGE PROCESSING CONTROLLER
210
MAINTENANCE CONTROL UNIT
209
INK SUPPLY CONTROL UNIT
208
HEAD CARRIAGE CONTROL UNIT
207
CONVEYANCE CONTROL UNIT
206
HEAD I/F
13
PRINTHEAD 10
11
30
22
12
40
49
41
13
14
PRINTING DIRECTION
15
21
17

10
11
30
22
12
40
49
41
13
14
15
21
17

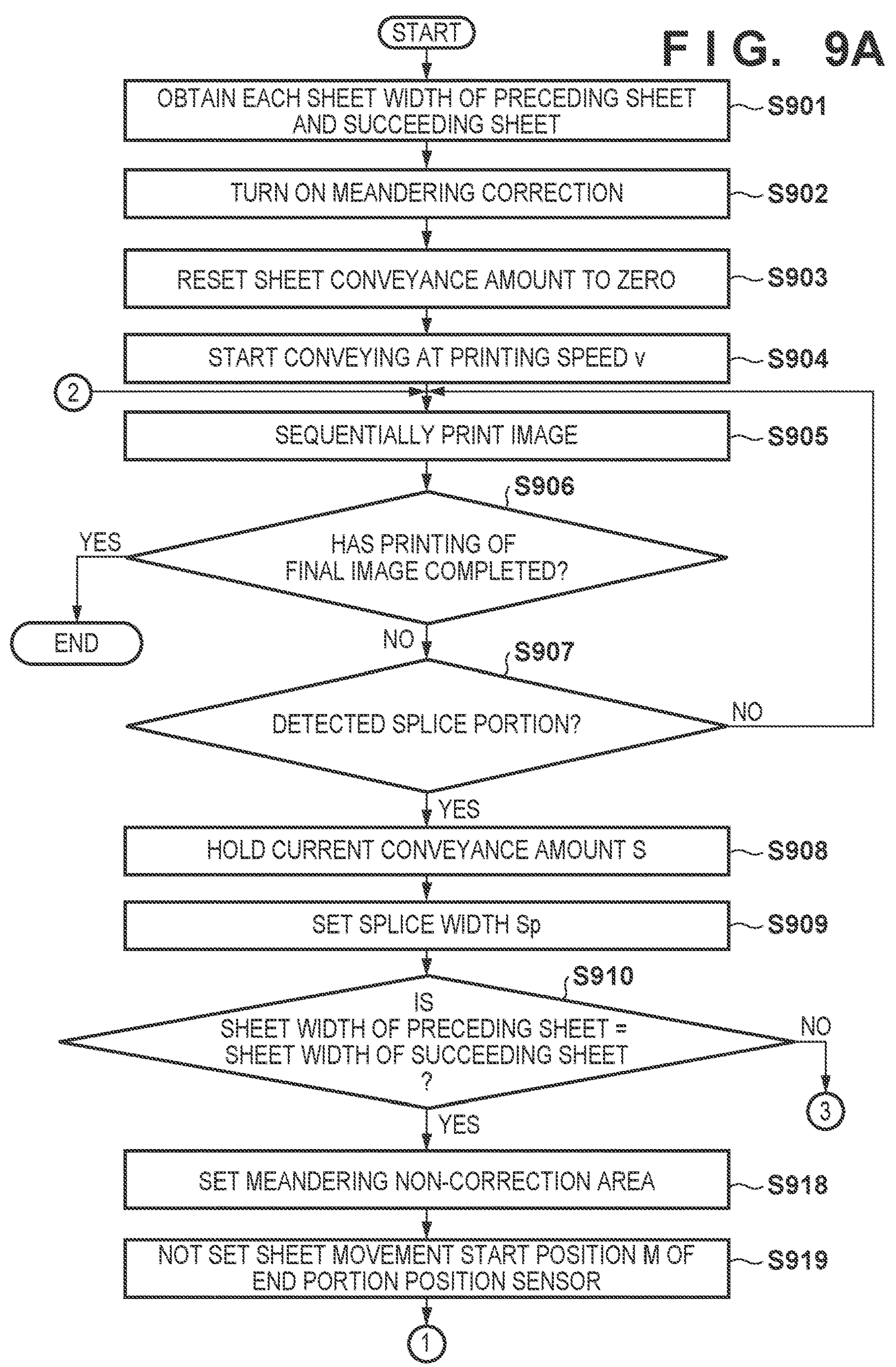

FIG. 9A
START
OBTAIN EACH SHEET WIDTH OF PRECEDING SHEET AND SUCCEEDING SHEET
S901
TURN ON MEANDERING CORRECTION
S902
RESET SHEET CONVEYANCE AMOUNT TO ZERO
S903
START CONVEYING AT PRINTING SPEED v
S904
2
SEQUENTIALLY PRINT IMAGE
S905
S906
HAS PRINTING OF FINAL IMAGE COMPLETED?
YES
END
NO
S907
DETECTED SPLICE PORTION?
NO
YES
HOLD CURRENT CONVEYANCE AMOUNT S
S908
SET SPLICE WIDTH Sp
S909
S910
IS SHEET WIDTH OF PRECEDING SHEET = SHEET WIDTH OF SUCCEEDING SHEET ?
NO
3
YES
SET MEANDERING NON-CORRECTION AREA
S918
NOT SET SHEET MOVEMENT START POSITION M OF END PORTION POSITION SENSOR
S919
1

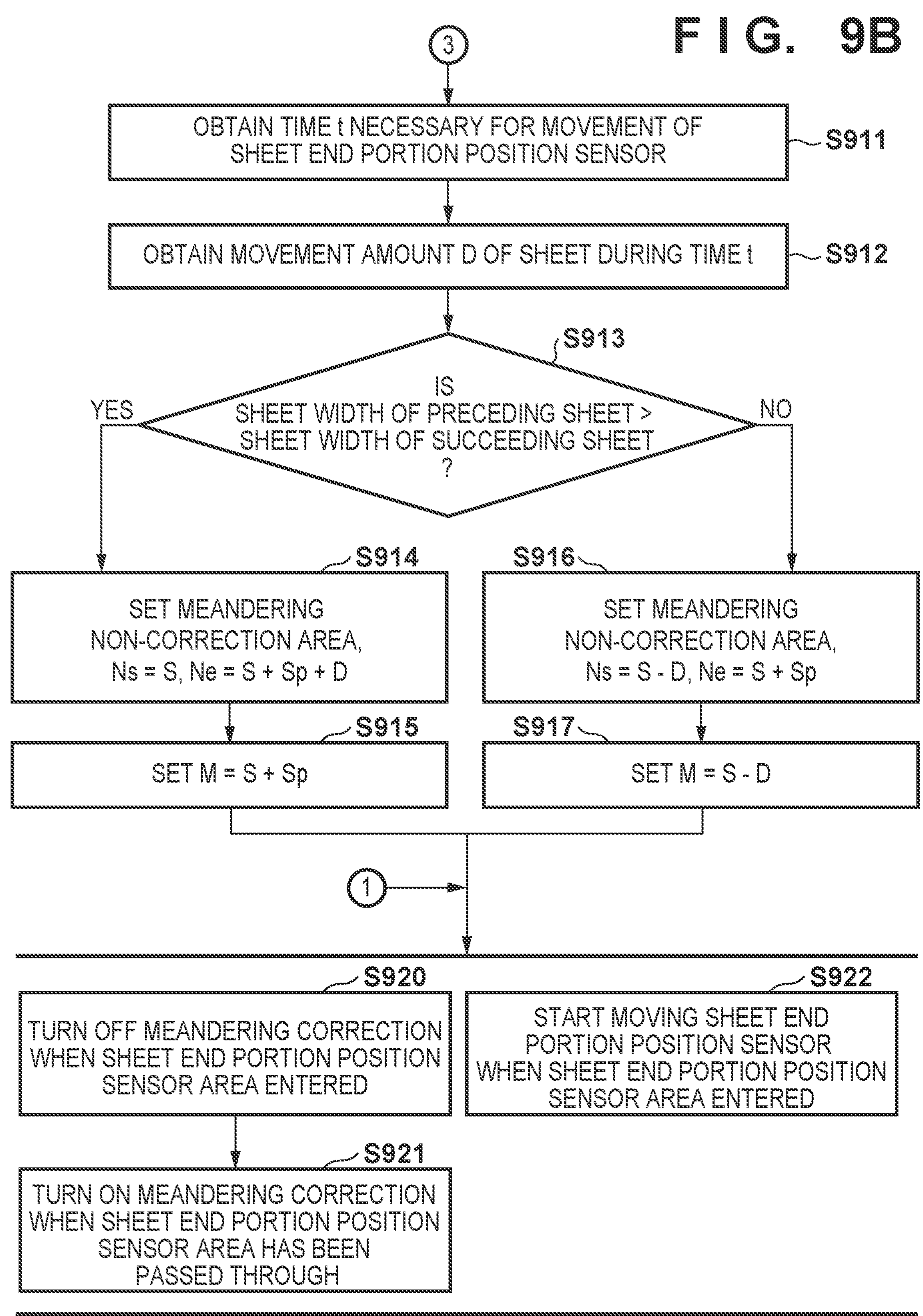
FIG. 9B
3
OBTAIN TIME t NECESSARY FOR MOVEMENT OF SHEET END PORTION POSITION SENSOR
S911
OBTAIN MOVEMENT AMOUNT D OF SHEET DURING TIME t
S912
S913
IS SHEET WIDTH OF PRECEDING SHEET > SHEET WIDTH OF SUCCEEDING SHEET ?
YES
NO
S914
SET MEANDERING NON-CORRECTION AREA, Ns = S, Ne = S + Sp + D
S916
SET MEANDERING NON-CORRECTION AREA, Ns = S - D, Ne = S + Sp
S915
SET M = S + Sp
S917
SET M = S - D
1
S920
TURN OFF MEANDERING CORRECTION WHEN SHEET END PORTION POSITION SENSOR AREA ENTERED
S922
START MOVING SHEET END PORTION POSITION SENSOR WHEN SHEET END PORTION POSITION SENSOR AREA ENTERED
S921
TURN ON MEANDERING CORRECTION WHEN SHEET END PORTION POSITION SENSOR AREA HAS BEEN PASSED THROUGH
2

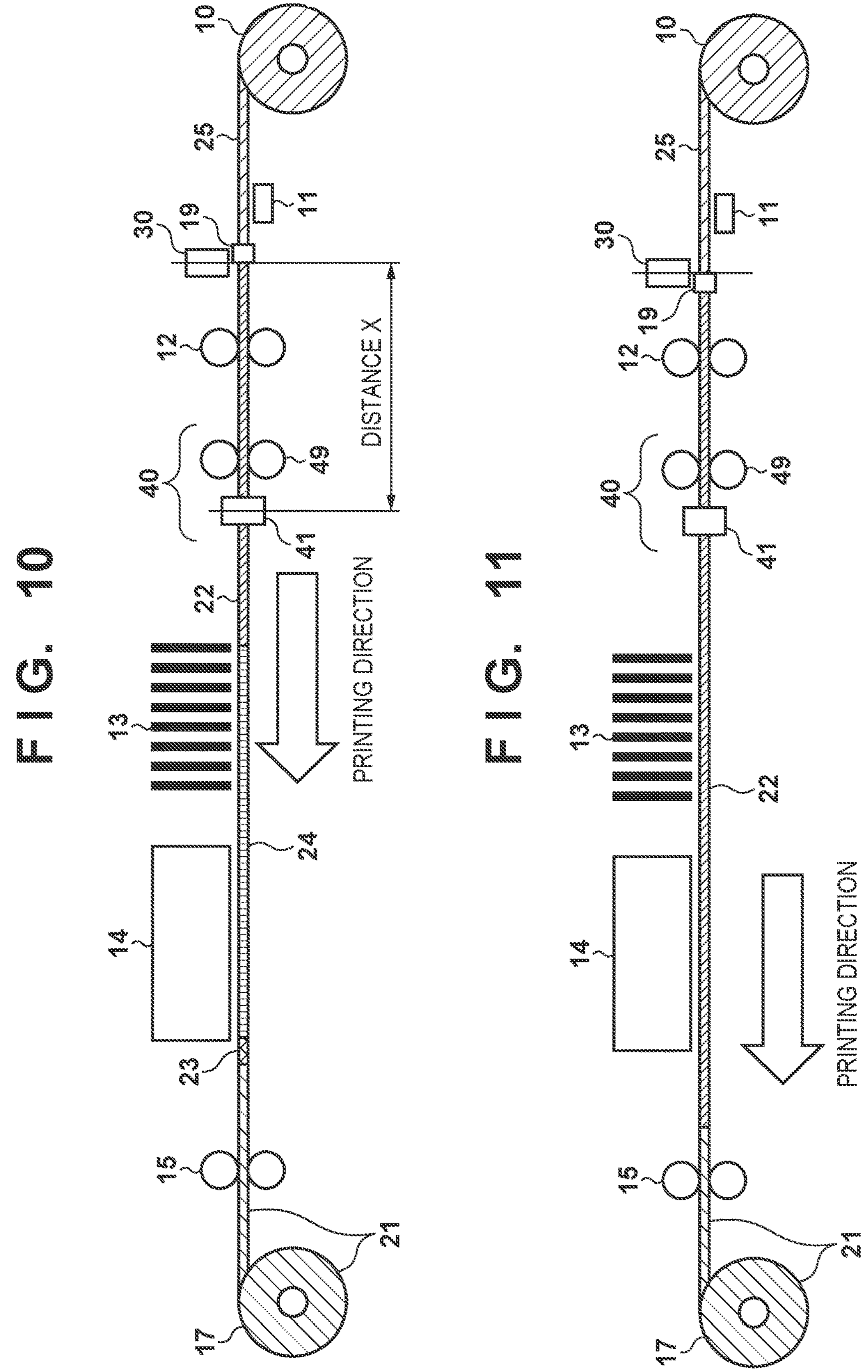
F I G. 10
10
25
11
30
19
12
DISTANCE X
40
49
41
22
PRINTING DIRECTION
13
24
14
23
15
21
17
F I G. 11
10
25
11
30
19
12
40
49
41
13
22
14
PRINTING DIRECTION
15
21
17

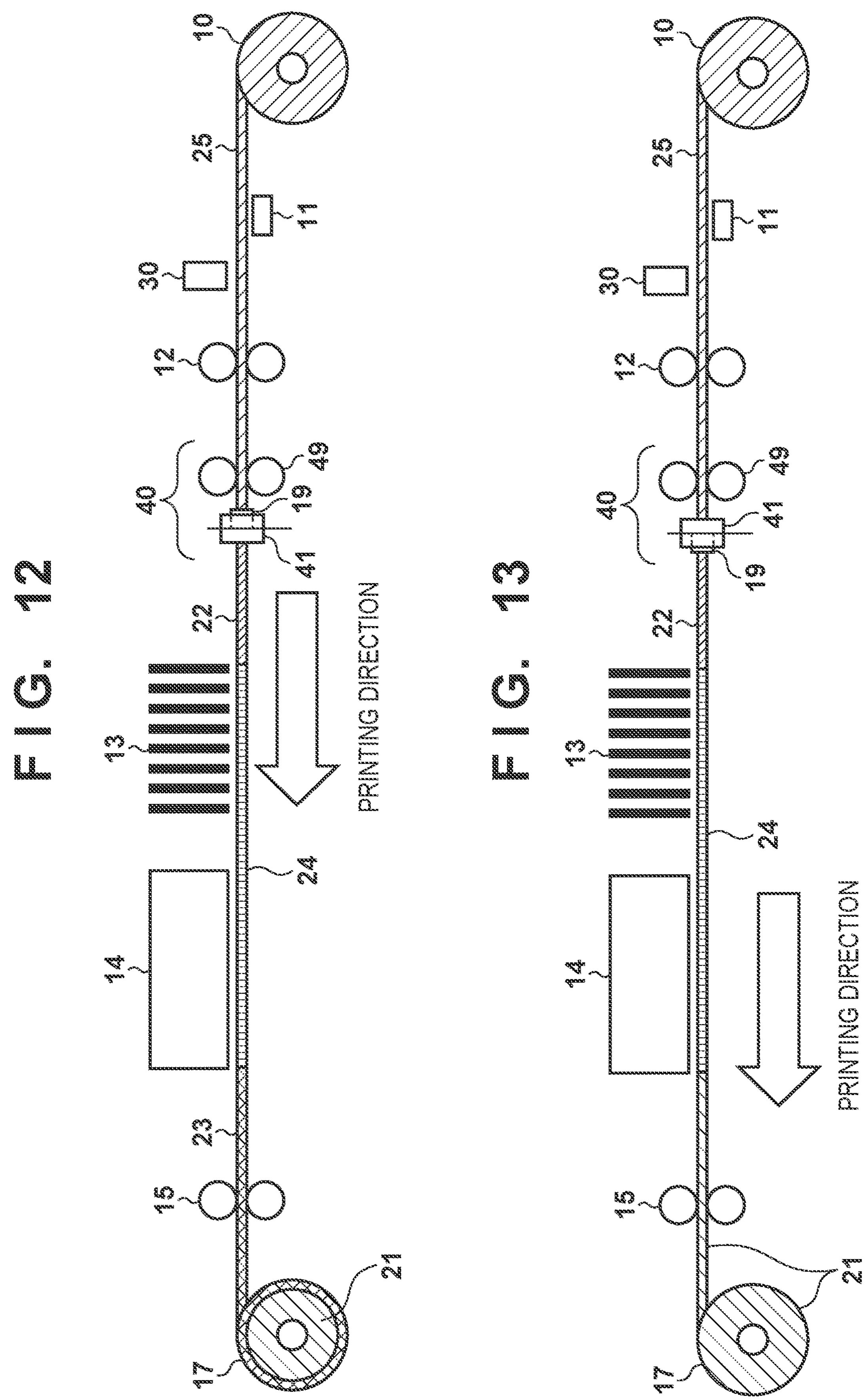
F I G. 12
10
25
11
30
12
40
49
19
41
22
13
PRINTING DIRECTION
24
14
23
15
21
17
F I G. 13
10
25
11
30
12
40
49
41
19
22
13
24
14
PRINTING DIRECTION
15
21
17

PRINTING APPARATUS AND CONTROL METHOD THEREFOR

BACKGROUND OF THE INVENTION

Field of the Invention

The present invention relates to a printing apparatus that prints an image on a sheet by a roll-to-roll scheme and a control method for the apparatus.

Description of the Related Art

A printing apparatus that performs so-called roll-to-roll printing, that is, continuously supplying a sheet wound in a roll and taking up the sheet upon printing uses a continuous sheet in a roll (to be referred to as a roll sheet hereinafter). When a roll sheet is to be replaced in such a printing apparatus, the preceding roll sheet set in the apparatus is cut in the width direction, and a new succeeding roll sheet is set in the paper feed portion after the paper core of the preceding roll sheet in the paper feed portion is removed. The leading end of the succeeding roll sheet is joined to the trailing end of the preceding roll sheet with a splice tape, and printing is continued. This operation of joining sheets with a splice tape is called splicing, and the joining portion is called a splice portion.

Assume that a roll sheet having such a splice portion is conveyed. In this case, when the splice portion passes through the sheet end position sensor of a roll sheet meandering correction device, the sensor may not properly sense the sheet end portion, resulting in failure to continue meandering correction necessary for printing. For this reason, the operator performs printing after feeding the roll sheet in the forward direction until the splice portion is taken up by a take-up portion after splicing. This makes it possible to perform printing while preventing the splice portion from entering the printing area including the meandering correction device. In this case, however, since printing cannot be performed on areas before and after the splice portion, paper waste occurs. For this reason, according to Japanese Patent Laid-Open No. 2014-28440, in order to reduce this paper waste, the shift amount of the succeeding roll sheet following the splice portion in the width direction is measured by a shift amount measurement unit, and the head position is adjusted in accordance with the measured shift amount. The patent literature discloses that this adjustment keeps the print position with respect to the sheet width equal between the preceding roll sheet and the succeeding roll sheet.

If, however, the sheet width changes before and after a splice portion, meandering correction sometimes cannot be properly performed.

SUMMARY OF THE INVENTION

The present invention provides a technique that can properly perform meandering correction for a preceding sheet and a succeeding sheet.

According to an aspect of the present invention, there is provided a printing apparatus that prints on a sheet supplied from a rolled sheet and takes up the sheet in a roll shape, the apparatus comprising: a splice detection unit configured to detect a splice portion of the sheet; a conveyance unit configured to convey the sheet; a meandering correction unit including a sensor unit configured to detect a sheet end portion of the sheet in a width direction of the sheet on a downstream side of the splice detection unit and configured to correct meandering of the sheet based on detection of the sheet end portion by the sensor unit; and a control unit configured to control the meandering correction unit based on a relationship between a position of the splice portion and a detection area of the sensor unit.

Further features of the present invention will become apparent from the following description of exemplary embodiments (with reference to the attached drawings).

BRIEF DESCRIPTION OF THE DRAWINGS

FIGS. 9A and 9B are flowcharts for explaining a printing sequence in the printing apparatus according to the embodiment;

FIG. 10 is a view showing a state in which a splice detection unit has detected a splice tape;

FIG. 11 is a view showing a state in which the splice detection unit has completed the detection of the splice tape;

FIG. 12 is a simplified view for explaining a state at the time of printing in the printing apparatus according to the embodiment;

FIG. 13 is a simplified view for explaining a state at the time of printing in the printing apparatus according to the embodiment;

DESCRIPTION OF THE EMBODIMENTS

Figure 1:
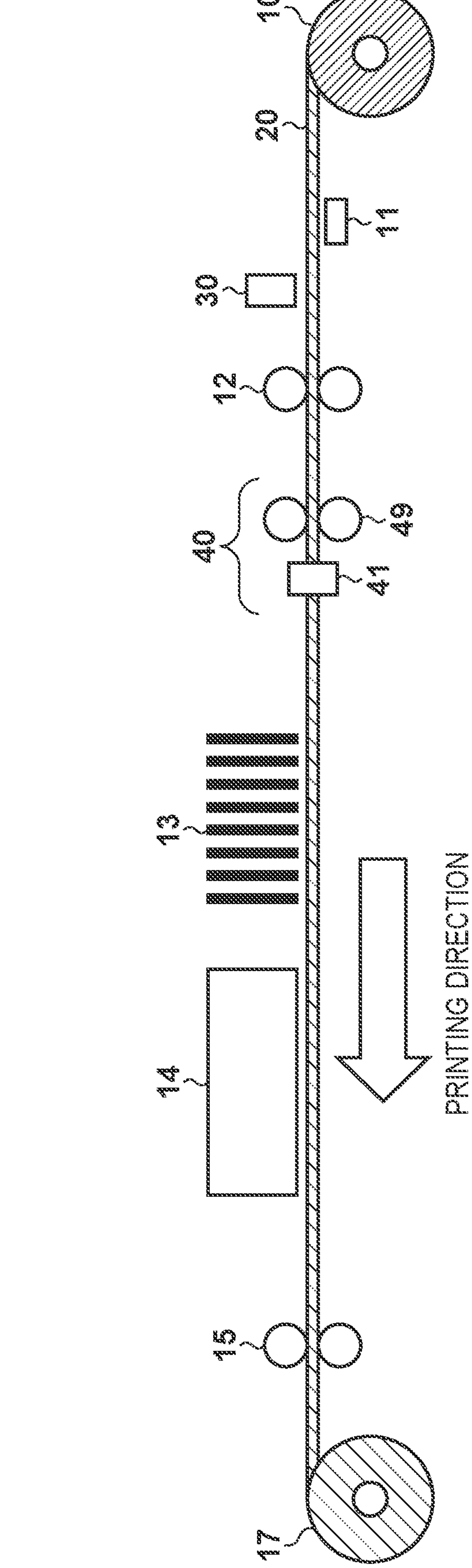
FIG. 1 is a simplified view of a conveyance path when an image printing apparatus according to an embodiment of the present invention is in a standby state.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that in this specification, "printing" not only includes the formation of significant information such as characters and graphics, regardless of whether they are significant or insignificant and whether they are so visualized as to be visually perceivable by humans. Printing broadly includes the formation of images, figures, patterns, and the like on a printing medium, or the processing of the medium.

FIG. 1 is a simplified view of a conveyance path when an image printing apparatus (to be referred to as a printing apparatus hereinafter) according to an embodiment of the present invention is in a standby state. Although FIG. 1 shows a simplified view for easy understanding, a roll sheet (to be sometimes simply referred to as a sheet hereinafter) is actually conveyed as follows. The roll sheet is conveyed first in the left direction from a sheet feed device 10 and undergoes printing. The roll sheet is then lowered and conveyed from left to right and dried and cooled. The roll sheet is further lowered and conveyed from right to left so as to trace a large "S" shape.

A sheet is sagged between the sheet feed device 10, main conveyance rollers 12, sub-conveyance rollers 15, and a take-up device 17, and a dancer roller (not shown) is provided to eliminate the influence of the sag. Note that the present invention is not limited to this arrangement. The main conveyance rollers 12 include an encoder (not shown) that can measure the rotation amount of the rollers. A roll sheet is attached to the sheet feed device 10. A splice table 11 and a splice detection unit 30 are provided at downstream positions of the sheet feed device 10.

When replacing a roll sheet, the user cuts a preceding roll sheet 20 on the splice table 11, loads a new roll sheet in the sheet feed device 10, and joins the leading end portion of the new roll sheet to the trailing end portion of the cut preceding roll sheet 20 left in the printing apparatus with a splice tape. This allows the user to replace a roll sheet by only feeding the leading end of the new roll sheet from the sheet feed device 10 to a position on the splice table 11. The splice detection unit 30 detects a splice portion (splice tape) on the sheet. In this case, the sheet is nipped by the main conveyance rollers 12 and the sub-conveyance rollers 15 and is conveyed by the rotation of the rollers. A meandering correction device 40 that stabilizes the conveyance of the sheet by correcting the position of the sheet in the width direction at the time of conveyance is provided downstream of the main conveyance rollers 12.

A printhead 13 as a printing unit is provided downstream of a sheet end portion position sensor 41. The printhead 13 has a plurality of head boards on which a plurality of nozzle arrays that discharge ink droplets corresponding to the respective colors are arranged. The printhead 13 performs printing by discharging ink onto a sheet conveyed in the printing direction. When printing is performed in this manner, the ink discharged onto the sheet is dried and cooled in a fixing area 14. A dryer is provided with a heater and a fan and dries a sheet. After drying, a cooler provided with the fan cools the sheet heated by the drier and the ink discharged onto the sheet. After cooling, the sheet having passed through the sub-conveyance rollers 15 is taken up by the take-up device 17.

Figure 2:
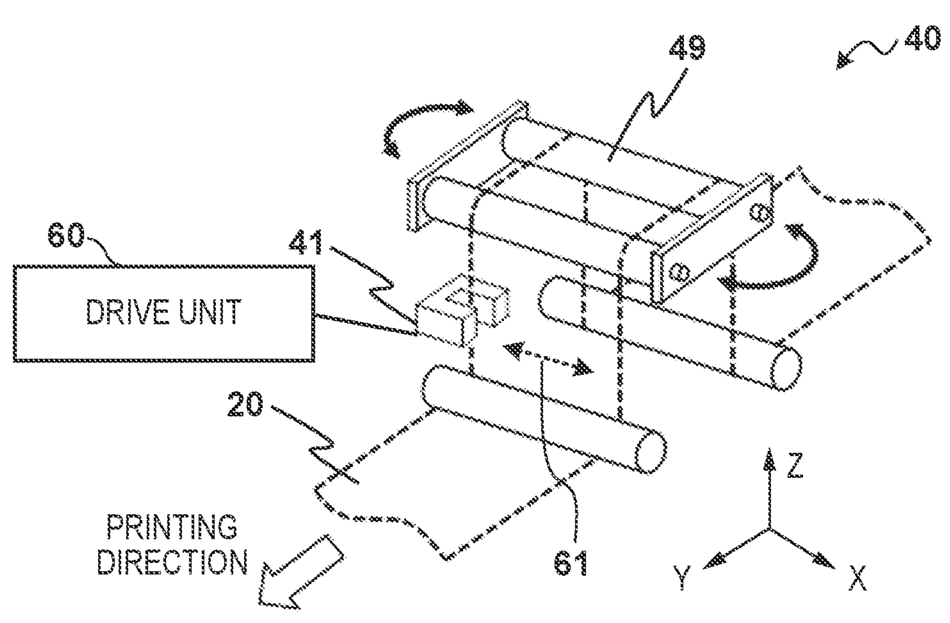
FIG. 2 is a perspective view for explaining the details of a meandering correction device according to the embodiment.

FIG. 2 is a perspective view for explaining the details of the meandering correction device 40 according to the embodiment.

The meandering correction device 40 detects the sheet end portion of the preceding roll sheet 20 with the sheet end portion position sensor 41 and performs meandering correction at the time of conveying the preceding roll sheet 20 by performing rotation control of a meandering correction unit 49 using the detection result. A drive unit 60 performs driving to move the sheet end portion position sensor 41 in the width direction (the direction indicated by a dotted line 61 in FIG. 2) of the sheet 20.

Figure 3:
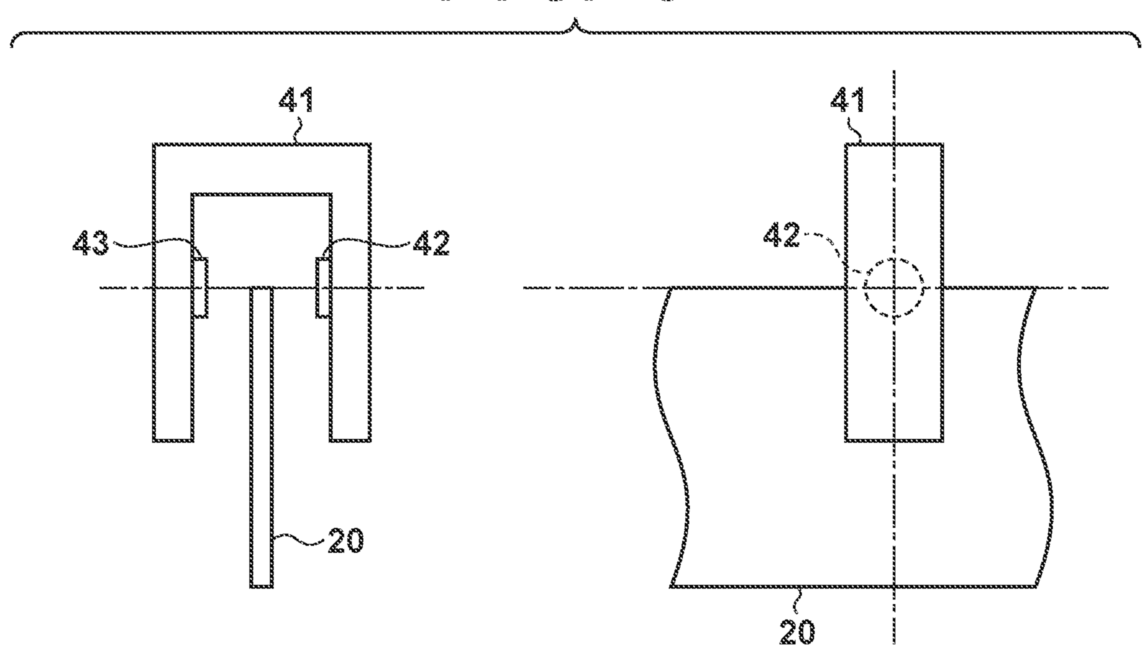
FIG. 3 is a view for explaining the arrangement of a sheet end portion position sensor according to the embodiment.

FIG. 3 is a view for explaining the arrangement of the sheet end portion position sensor 41 according to the embodiment.

The sheet end portion position sensor 41 includes an ultrasonic sensor having an ultrasonic transmission unit 42 and an ultrasonic reception unit 43 arranged to face each other. Meandering correction for the sheet 20 is performed by continuously performing rotation control of the meandering correction unit 49 so as to always locate a sheet end portion of the sheet 20 at almost the center of the ultrasonic sensor. In this case, the sheet end portion position sensor 41 is configured to move in the sheet width direction and hence can accurately detect an end portion of a sheet even when the preceding sheet on the downstream side of a splice portion differs in sheet width from the succeeding sheet on the upstream side.

Figure 4:
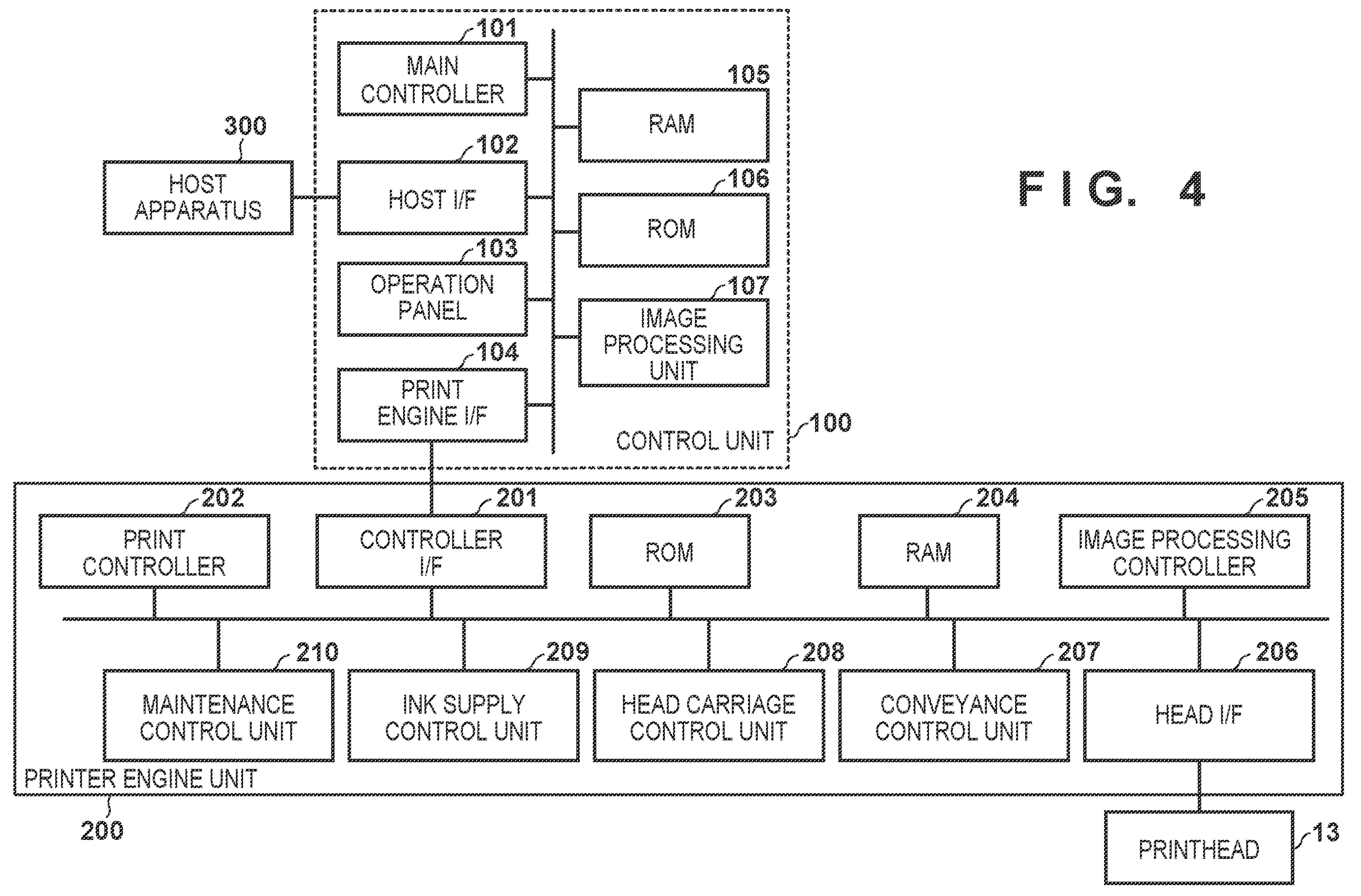
FIG. 4 is a block diagram for explaining the control arrangement of the printing apparatus according to the embodiment.

FIG. 4 is a block diagram for explaining the control arrangement of the printing apparatus according to the embodiment. This control arrangement includes a print engine unit 200 that provides comprehensive control for mainly the print engine and a control unit 100 that provides comprehensive control for the overall printing apparatus. A print controller 202 of the print engine unit 200 controls various mechanisms of the print engine unit 200 in accordance with instructions from a main controller 101 of the control unit 100. The details of the control arrangement will be described below.

The control unit 100 will be described first.

The main controller 101 including a CPU controls the overall printing apparatus using a RAM 105 as a work area in accordance with programs and various parameters stored in a ROM 106. When, for example, a print job is input from a host apparatus 300 via a host I/F 102, an image processing unit 107 performs predetermined image processing for the received image data in accordance with an instruction from the main controller 101. The main controller 101 transmits the image data having undergone the image processing to the print engine unit 200 via a print engine I/F 104. Note that this printing apparatus may obtain image data from an external storage device (such as a USB memory) connected to the apparatus. An operation panel 103 is a device for allowing the user to perform an input/output operation with respect to the printing apparatus. The user can perform, via the operation panel 103, issuing instructions to perform operations including printing and paper feeding, setting printing modes, and recognizing information concerning the printing apparatus. The operation panel 103 is a touch panel, to which a pointing device and a keyboard are connected to allow the user to perform input operations.

The print engine unit 200 will be described next.

A print controller 202 including a CPU controls various mechanisms of the printing apparatus using a RAM 204 as a work area in accordance with programs and various parameters stored in a ROM 203. Upon receiving various commands and image data from the control unit 100 via a controller I/F 201, the print controller 202 temporarily saves such data in the RAM 204. In order to allow the use of the printhead 13 for a printing operation, the print controller 202 causes an image processing controller 205 to convert image data saved in the RAM 204 into print data. When the print data is generated, the print controller 202 causes the printhead 13 to execute a printing operation based on the print data via a head I/F 206. In this case, the print controller 202 conveys a sheet as a print medium by driving the sheet feed device 10, the main conveyance rollers 12, the sub-conveyance rollers 15, and the take-up device 17 shown in FIG. 1 via a conveyance control unit 207. In addition, the print controller 202 dries and cools the conveyed sheet by driving the heater and the fan of the fixing area 14 via the conveyance control unit 207. Furthermore, the conveyance control unit 207 can detect the conveyance amount of the sheet from the encoder provided on the conveyance roller. In accordance with an instruction from the print controller 202, the printhead 13 executes a printing operation in synchronism with the conveying operation of the sheet, thereby performing print processing.

The printhead 13 is configured to move up and down. In printing in the manner shown in FIG. 1, the printhead 13 is lowered toward the sheet 20. At the time of maintenance or the like, the printhead 13 is raised to a position away from the sheet 20. A head carriage control unit 208 changes the up/down position of the printhead 13 in accordance with the maintenance state or printing state of the printing apparatus. An ink supply control unit 209 controls the ink supply unit so as to make the pressure of ink supplied to the printhead 13 fall within a proper range. When performing a maintenance operation for the printhead 13, a maintenance control unit 210 moves a maintenance unit below the raised printhead 13 and controls a head maintenance operation for the cap, wiping, and the like of the head.

A splicing operation for the replacement of a roll sheet, which is preliminary reparation for the apparatus for a printing sequence according to the embodiment, will be described next with reference to FIGS. 5 to 8 each showing a simplified view of the apparatus.

Figures 5, 6:
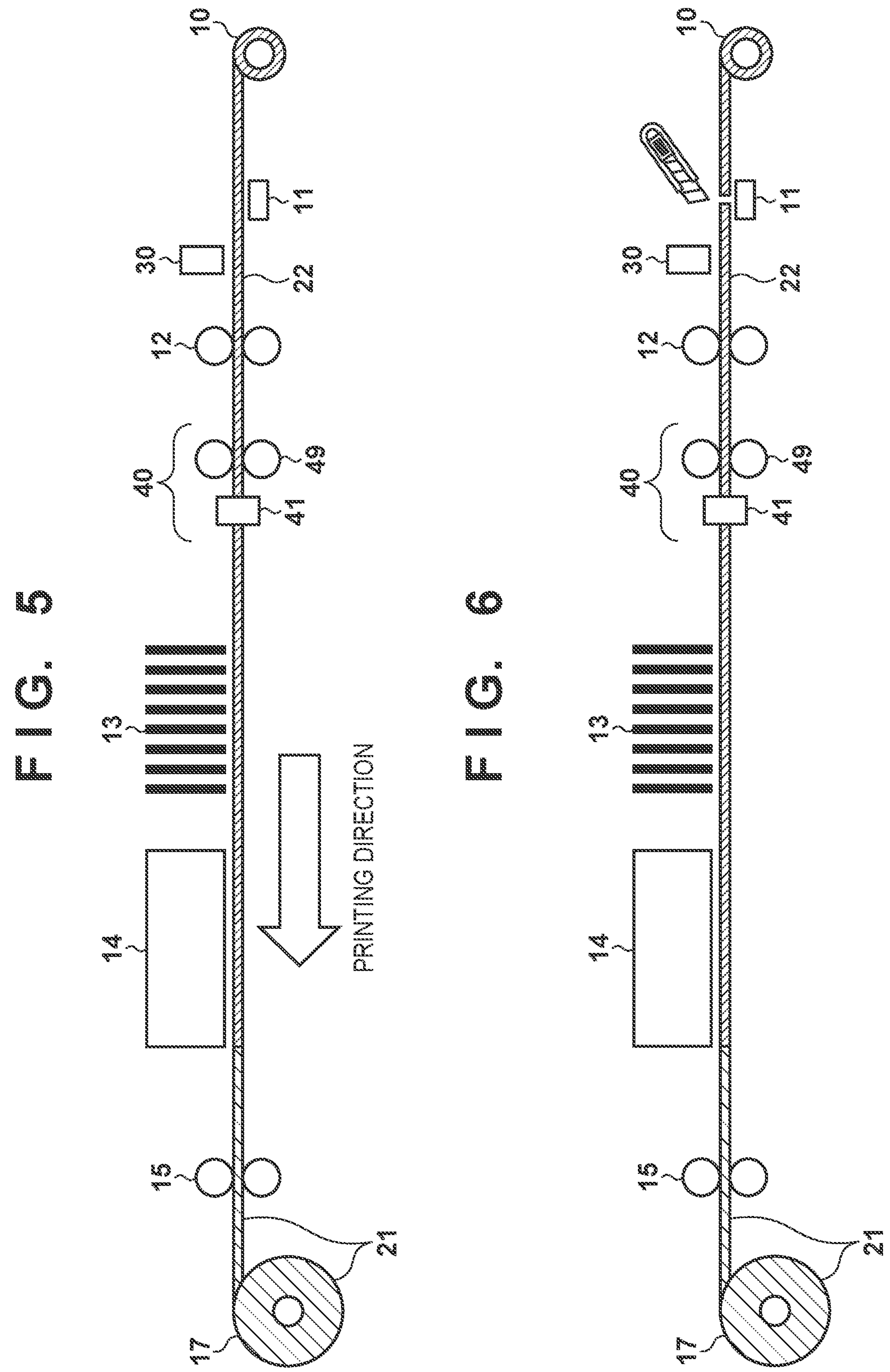
FIG. 5 is a view showing a state in which the printing apparatus according to the embodiment of the present invention has stopped operating upon completion of printing.
FIG. 6 is a view showing a state in which a sheet is cut on a splice table to replace a roll sheet while the remaining amount of the roll sheet in a sheet feed device becomes small.

FIG. 5 is a view showing a state in which the printing apparatus according to the embodiment of the present invention has stopped operating upon completion of printing.

Preceding sheets include a printed preceding sheet 21 on the downstream side of the fixing area 14 and an unprinted preceding sheet 22 on which no printing has been done. In this state, the remaining amount of the roll sheet in the sheet feed device 10 is small.

FIG. 6 is a view showing a state in which a sheet is cut on the splice table 11 to replace a roll sheet while the remaining amount of the roll sheet in the sheet feed device 10 becomes small.

As shown in FIG. 6, the user cuts a sheet on the splice table 11. Subsequently, the user removes the roll sheet from the sheet feed device 10.

Figures 7, 8:
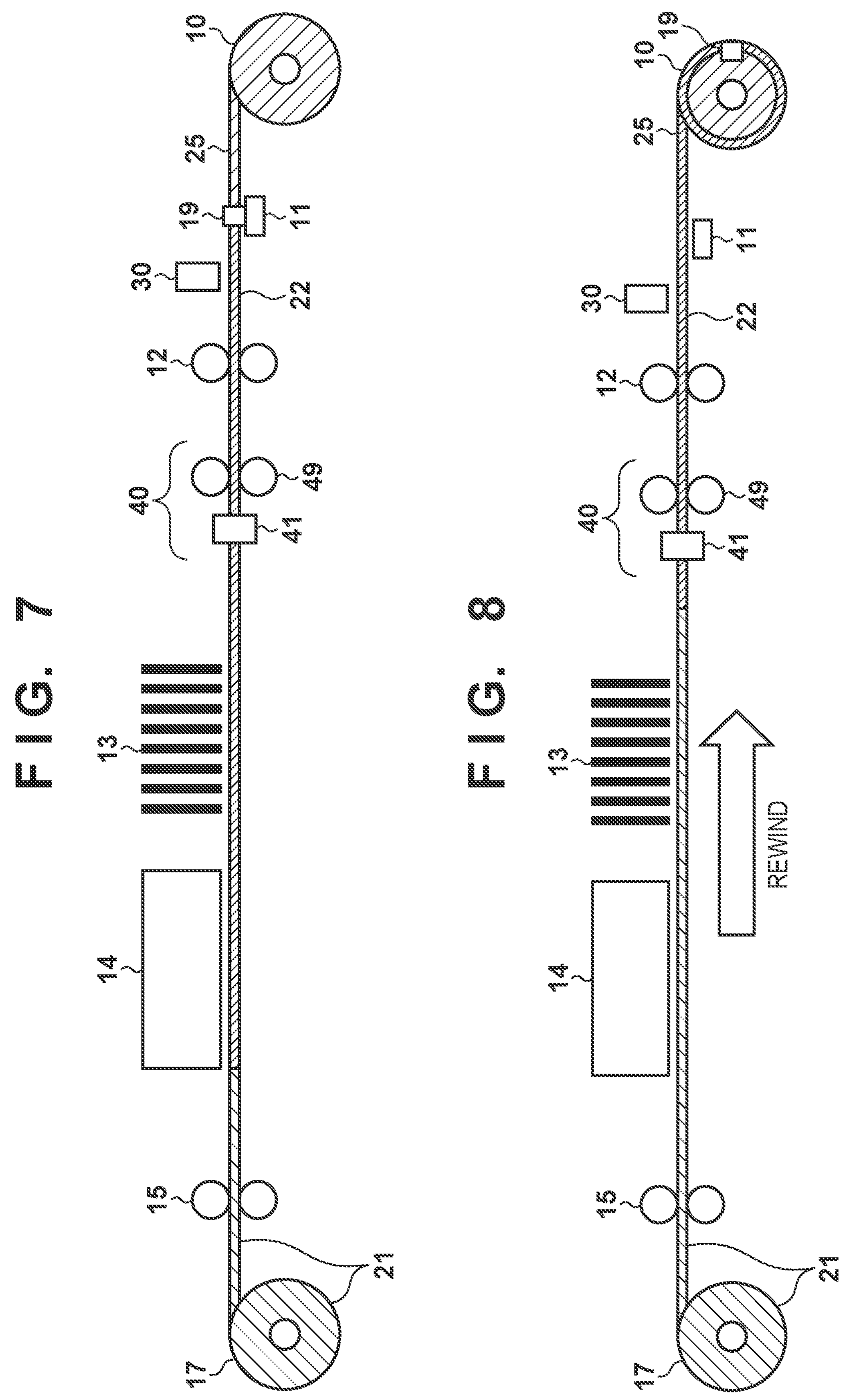
FIG. 7 is a view showing a state in which a new roll sheet is set in the sheet feed device, and the leading end of the new roll sheet is spliced to the trailing end of the preceding sheet.
FIG. 8 is a view showing a state in which a sheet is fed in the backward direction until the leading end of an unprinted preceding sheet reaches the upstream side of the printhead.

FIG. 7 is a view showing a state in which a new roll sheet is set in the sheet feed device 10, and the leading end of the new roll sheet is spliced to the trailing end of the preceding sheet.

Referring to FIG. 7, the user attaches a new succeeding roll sheet 25 to the sheet feed device 10 and brings the leading end of the succeeding roll sheet 25 to the splice table 11. The user then joins the trailing end of the preceding sheet to the leading end of the sheet of the succeeding roll sheet 25 with a splice tape 19, thereby completing the splicing.

FIG. 8 is a view showing a state in which a sheet is fed in the backward direction (toward the sheet feed device 10) until the leading end of the unprinted preceding sheet 22 reaches the upstream side of the printhead 13.

As shown in FIG. 8, until the leading end of the unprinted preceding sheet 22 reaches the upstream side of the printhead 13, the sheet is fed in the backward direction (toward the sheet feed device 10) and stopped. Starting next printing from this state makes it possible to also print on the unprinted preceding sheet 22 and suppress the occurrence of paper waste.

FIGS. 9A and 9B are flowcharts for explaining a printing sequence in the printing apparatus according to the embodiment.

FIGS. 10 to 13 are simplified views for explaining a state of the printing apparatus according to the embodiment at the time of printing. A printing sequence by the printing apparatus according to the embodiment will be described below with reference to these drawings.

First of all, in step S901, the main controller 101 obtains the sheet width of a preceding sheet on the downstream side of a splice portion and the sheet width of a succeeding sheet on the upstream side of the splice portion. For example, when a print job is transmitted, it is preferable to use the sheet width value set in print setting by the user using the operation panel 103. The process then advances to step S902, in which the conveyance control unit 207 starts meandering control using the meandering correction device 40 (meandering control ON). The process then advances to step S903, in which the conveyance control unit 207 resets the sheet (paper) conveyance amount to zero. This sheet conveyance amount can be calculated from the encoder value of the main conveyance rollers 12 and the roller diameter.

In step S904, the conveyance control unit 207 drives the main conveyance rollers 12, the sub-conveyance rollers 15, the sheet feed device 10, and the take-up device 17 to start conveying a sheet at a printing speed v (mm/sec).

The process then advances to step S905, in which the print controller 202 prints a unit image using the printhead 13 via the head I/F 206 based on print data. In this case, a unit image indicates image data printed by driving the printhead 13 once. The process advances to step S906, in which the print controller 202 determines whether the printing of a final image is completed. In this case, if the printing of the final image is not completed, the process advances to step S907. If the printing of the final image is completed, the processing is terminated. In step S907, the conveyance control unit 207 determines whether the splice detection unit 30 has detected the splice tape 19 (splice portion). The splice tape can be detected by measuring the length of the sheet in the thickness direction with an optical displacement sensor (not shown) provided in the splice detection unit 30. In this case, the splice tape can be detected by detecting a “splice tape detection start” at which the measurement value becomes larger than the thickness of the sheet and a “splice tape detection end” at which the measurement value becomes smaller than the thickness of the sheet from the “splice table detection” state or the measurement value becomes approximate to the thickness of the sheet. If the splice tape 19 is not detected in step S907, the process returns to step S905 to print a next unit image. If the splice tape is detected in step S907 (FIG. 10), the process advances to step S908.

FIG. 10 is a view showing a state in which the splice detection unit 30 has detected the splice tape 19 (splice portion).

In step S908, the conveyance control unit 207 holds the current conveyance amount of the sheet as a conveyance amount S. The conveyance amount S indicates the conveyance amount of the sheet counted from the start of the conveyance of the sheet in step S904. Accordingly, the print controller 202 calculates the conveyance amount along with the conveyance of the sheet based on, for example, an output from the encoder described above. The process advances to step S909, in which the conveyance control unit 207 obtains the length of the sheet in the conveying direction until the splice detection unit 30 completes the detection of the splice tape 19 and holds the obtained length as a splice width Sp. Note that referring to FIG. 10, a distance X indicates the distance from the position at which the splice detection unit 30 detects the splice tape 19 to the sheet end portion position sensor 41. Note that whether the sheet has moved by the distance X since the detection of the splice portion by the splice detection unit 30 at the time of printing can be determined based on the encoder value of the main conveyance rollers 12 and the roller diameter which are described above.

FIG. 11 is a view showing a state in which the splice detection unit 30 has completed the detection of the splice tape 19. In this case, letting Se be the conveyance amount when the detection of the splice tape 19 is completed, the splice width Sp is given as Sp=S−Se.

The process then advances to step S910, in which the print controller 202 compares the sheet width of the preceding sheet on the downstream side of the splice portion with the sheet width of the succeeding sheet on the upstream side. If the sheet widths are equal to each other, the process advances to step S918; otherwise, the process advances to step S911. At this time, the sheet widths of the preceding sheet and the succeeding sheet are the sheet width values set in print setting by the user with the operation panel 103 and obtained from the main controller 101.

(1) when Sheet Width of Preceding Sheet is Equal to that of Succeeding Sheet

In step S918, the print controller 202 sets a meandering non-correction area (area in which no meandering correction is executed) by setting a start point Ns and an end point Ne of the meandering non-correction area as Ns=S and Ne=S+Sp. Start point Ns=S and end point Ne=S+Sp can be regarded as virtual points set on the sheet based on the conveyance amount of the sheet at that point of time. In step S919, the print controller 202 sets a movement start position M to "no setting" because there is no need to move the sheet end portion position sensor 41. When the set start point reaches the detection area of the sheet end portion position sensor 41 upon conveyance of the sheet, the print controller 202 controls in step S920 to inhibit the meandering correction device 40 from executing meandering correction. That is, the operation in step S920 is equivalent to that the sheet is conveyed by the distance X in FIG. 10 since the detection of the splice tape 19 by the splice detection unit 30. As described above, whether the sheet is conveyed by the distance X can be determined based on the encoder value of the main conveyance rollers 12 and the roller diameter. When the end point passes through the detection area of the sheet end portion position sensor 41 upon conveyance of the sheet, the print controller 202 controls the meandering correction device 40 in step S922 to start meandering correction.

As described above, when the sheet width of the preceding sheet is equal to that of the succeeding sheet, the meandering correction device 40 is inhibited from performing meandering correction while the splice portion passes through the detection area of the sheet end portion position sensor 41.

(2) When Sheet Width of Preceding Sheet is not Equal to that of Succeeding Sheet In step S911, the print controller 202 obtains a time t required for the sheet end portion position sensor 41 to move in the sheet width direction from the current position of the sensor to the position at which the sensor detects an end portion of the succeeding sheet. Since the sheet width of the preceding sheet is not equal to that of the succeeding sheet, the sensor position corresponding to the sheet width of the preceding sheet needs to be moved to the sensor position corresponding to the sheet width of the succeeding sheet in the sheet width direction by a distance corresponding to the difference between the sheet widths. Accordingly, a movement time to move the sheet end portion position sensor 41 in the sheet width direction is obtained in advance. The time t can be obtained from control parameters (a target speed, an acceleration, and a deceleration) of the motor (not shown) of the drive unit 60 that moves the sheet end portion position sensor 41.

A specific manner of obtaining the time t in trapezoidal control will be described with reference to, for example, FIG. 17.

Figure 17:
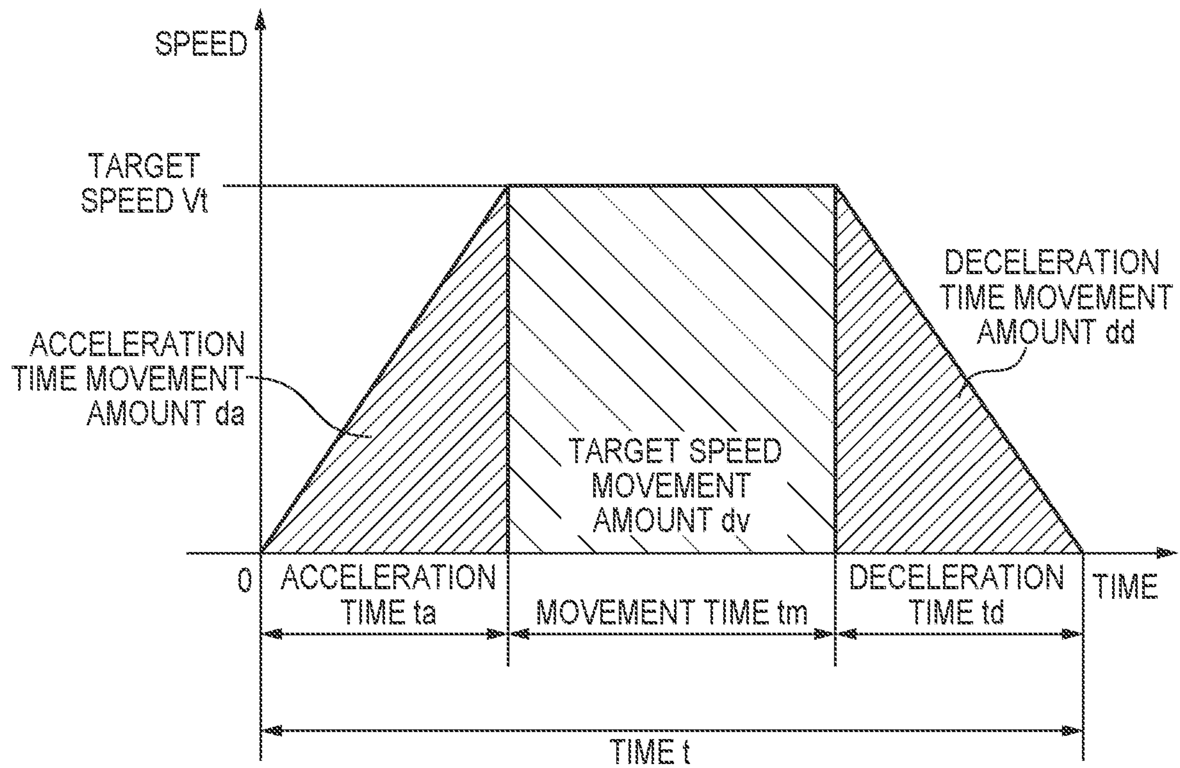
FIG. 17 is a graph for explaining rotation drive control for a motor.

FIG. 17 is a graph for explaining rotation drive control for the motor.

First of all, a total movement distance d by which the sheet end position sensor 41 should move is obtained from total movement distance d, an acceleration time movement amount da, a target speed movement amount dv, and a deceleration time movement amount dd according to $$d=da+dv+dd \quad (1)$$

In this case, the relationship between a target rotational speed Vt, a rotational acceleration a and the acceleration time movement amount da is represented by $$da=Vt\times Vt\div 2a \quad (2)$$

Likewise, the relationship between the target rotational speed Vt, a deceleration d, and a deceleration time td is represented by $$dd=Vt\times Vt\div 2d \quad (3)$$

In this case, if Vt, a, and d are specified values determined in advance as design values based on the load determined by the drive torque of a drive actuator, the weight of the sheet end portion position sensor 41 of an object to be driven, and friction at the time of driving, da and dd are also specified values.

In addition, the relationship between the target speed movement amount dv, the target rotational speed Vt, and a movement time tm is represented by $$dv=Vt\times tm \quad (4)$$

According to equations (1) to (4), $$\text{movement time } tm=(d-da-dd)-Vt \quad (5)$$

The time t is expressed by an acceleration time ta, the deceleration time td, and the movement time tm as $$t=ta+tm+td \quad (6)$$

$$\text{In addition, } ta=Vt\div a \quad (7)$$

and $$td=Vt\div d \quad (8)$$

Therefore, according to equations (5) to (8), the time t can be obtained as $$t=(Vt\div a)+((d-da-dd)\div Vt))+(Vt\div d)$$

The process advances to step S912, in which the print controller 202 obtains a conveyance amount D of the sheet conveyed at the current printing speed during the time t. That is, in order to detect the sheet width of the new sheet, the conveyance amount D by which the sheet is conveyed while the sheet end portion position sensor 41 is moved in the sheet width direction is obtained. The conveyance amount D is obtained from a conveyance speed v and a conveyance time t of the sheet according to D=v×t.

The process advances to step S913, in which the print controller 202 compares the sheet width of the preceding sheet with that of the succeeding sheet. If (sheet width of preceding sheet)>(sheet width of succeeding sheet), the process advances to step S914; otherwise, the process advances to step S916. In step S914, the print controller 202 sets a meandering non-correction area with start point Ns=S and end point Ne=S+Sp+D. In this as well, the start point and the end point indicate positions virtually set on the sheet. The process then advances to step S915, in which the print controller 202 sets the movement start position M of the sheet end portion position sensor 41 as M=S+Sp. This is because since the sheet width of the preceding sheet is larger, the sheet end portion position sensor 41 may start moving at a time point when the splice portion passes through the detection area of the sheet end portion position sensor 41. When the start point Ns reaches the detection area of the sheet end portion position sensor 41 upon conveyance of the sheet, the print controller 202 controls the meandering correction device 40 so as not to execute meandering correction in step S922. When the end point passes through the detection area of the sheet end portion position sensor 41 upon further conveyance of the sheet, the sheet end portion position sensor 41 starts moving to the position at which the sensor can detect an end portion of the succeeding sheet. When the conveyance amount of the sheet conveyed during the time t required for the movement becomes D since the start of the movement, the print controller 202 controls the meandering correction device 40 to start meandering correction.

This makes it possible to continue printing while properly controlling meandering correction and reducing paper waste even if the sheet width of the succeeding sheet is smaller than that of the preceding sheet.

If (sheet width of preceding sheet)<(sheet width of succeeding sheet) in step S913, the process advances to step S916, in which the print controller 202 sets a meandering non-correction area with start point Ns=S−D and end point Ne=S+Sp. In this case as well, the start point and the end point indicate positions virtually set on the sheet. The process then advances to step S917, in which the print controller 202 sets the movement start position M of the sheet end portion position sensor 41 as M=S−D. That is, the movement start position of the sheet end portion position sensor 41 is equal to the start position of the meandering non-correction area. This is because, if the sheet width of the succeeding sheet is larger than that of the preceding sheet, it is necessary to start moving the sheet end portion position sensor 41 before a predictive time point when the splice portion reaches the detection area of the sheet end portion position sensor 41. When the start point Ns (S−D) reaches the detection area of the sheet end portion position sensor 41 upon conveyance of the sheet, the print controller 202 controls the meandering correction device 40 so as not to execute meandering correction in step S922. That is, the print controller 202 controls the meandering correction device 40 so as not to execute meandering correction at a position preceding the splice portion by the conveyance amount D of the sheet conveyed during the time t required for the sheet end portion position sensor 41 to move. When the end point (S+Sp) passes through the detection area of the sheet end portion position sensor 41 upon further conveyance of the sheet end portion position sensor 41, the movement of the sheet end portion position sensor 41 to a position at which an end portion of the succeeding sheet can be detected is completed. Accordingly, the print controller 202 performs control to start meandering correction immediately after the end point (S+Sp) passes through the detection area of the sheet end portion position sensor 41.

This makes it possible to continue printing while properly controlling meandering correction and reducing paper waste even if the sheet width of the succeeding sheet is larger than that of the preceding sheet.

As described above, it is possible to start controlling the movement of the start point Ns and the end point Ne of the proper meandering non-correction area and the sheet end portion position sensor 41 based on the relationship between the sheet width of the preceding sheet and the sheet width of the succeeding sheet.

The details of operations in steps S920 to S922 will be described below with reference to FIGS. 14 to 16.

Figure 14:
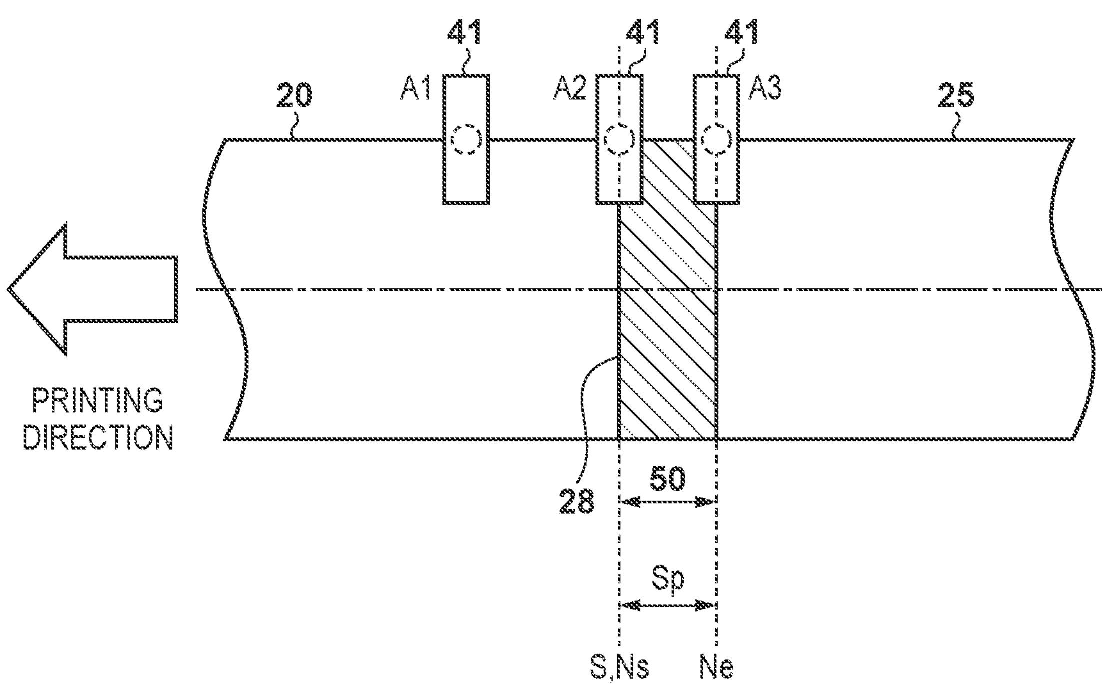
FIG. 14 is a view for explaining an example of determining the width of a meandering non-correction area when the sheet width of a preceding sheet is equal to that of a succeeding sheet.
Figure 15:
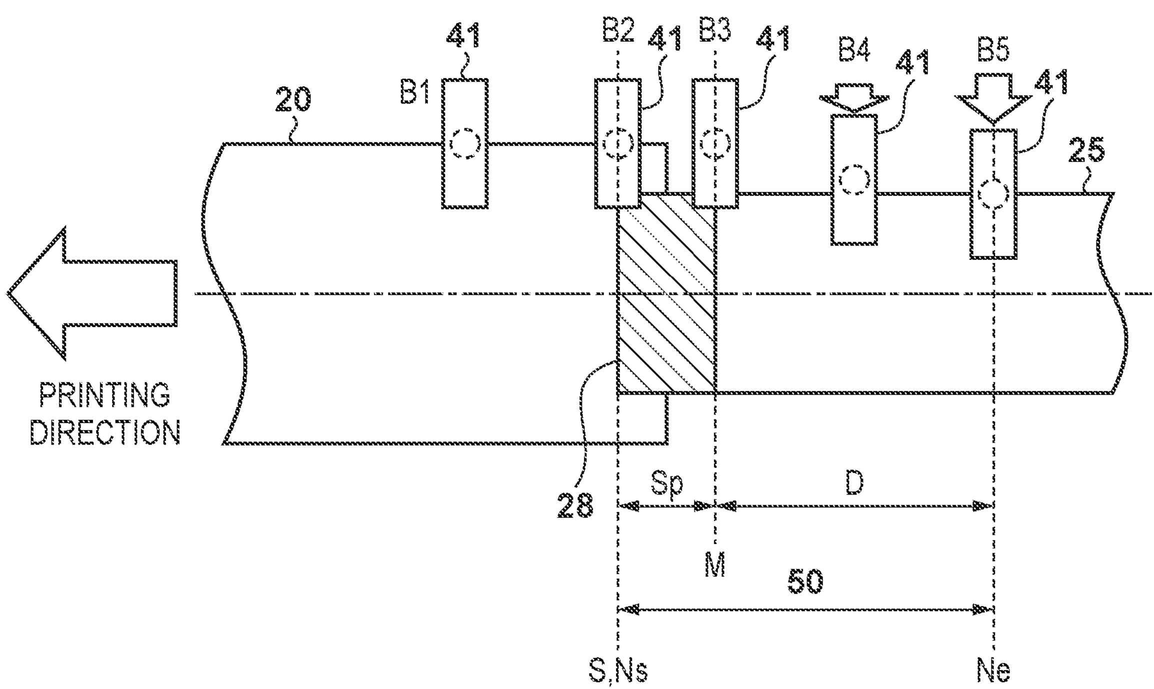
FIG. 15 is a view for explaining an example of determining the width of a meandering non-correction area when the sheet width of a preceding sheet is larger than that of a succeeding sheet.
Figure 16:
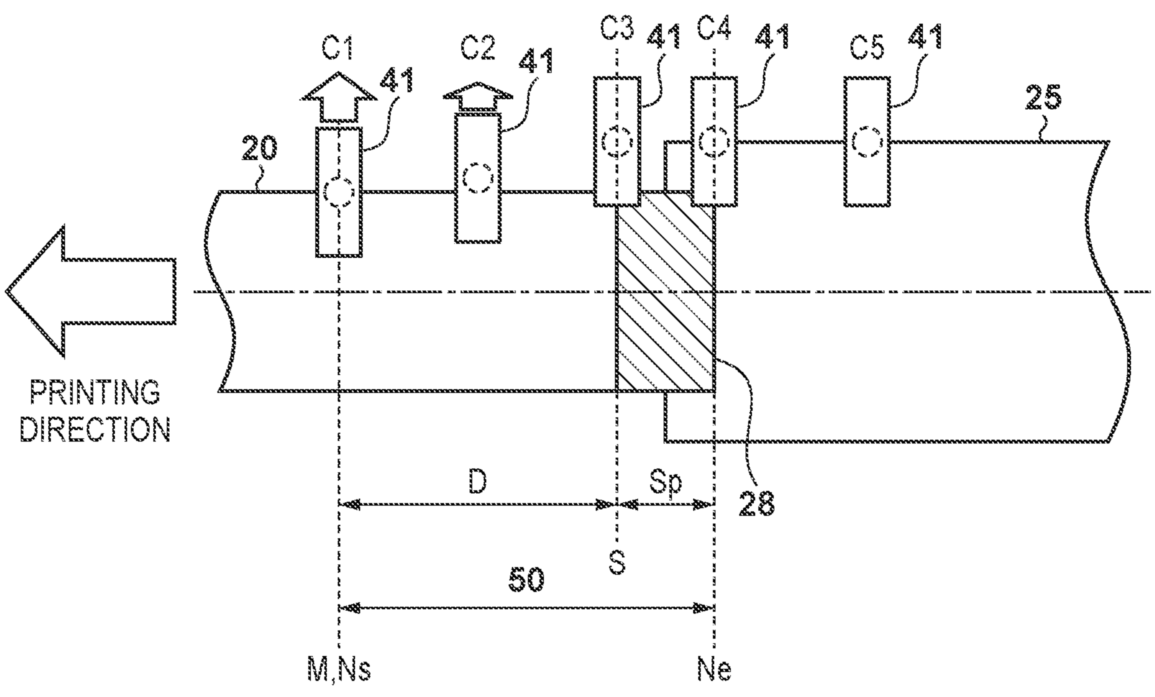
FIG. 16 is a view for explaining an example of determining the width of a meandering non-correction area when the sheet width of a preceding sheet is smaller than that of a succeeding sheet.

FIGS. 14 to 16 show the positional relationship between the splice tape 19, the preceding sheet 20, the succeeding sheet 25, a meandering non-correction area 50, and the sheet end portion position sensor 41, with the coordinates on the sheet being fixed, when the sheet is conveyed.

(1) when Sheet Width of Preceding Sheet is Equal to that of Succeeding Sheet

FIG. 14 is a view for explaining an example of determining the width of the meandering non-correction area 50 when the sheet width of a preceding sheet is equal to that of a succeeding sheet.

As shown in FIG. 14, start point Ns=S and end point Ne=S+Sp. The width of the meandering non-correction area 50 is equal to Sp, that is, the width of the splice tape 19. As the sheet is conveyed, the timing at which the sheet end portion position sensor 41 detects a sheet end portion makes transition of A1⇒A2⇒A3 (FIG. 12 shows a state in which the splice tape 19 has reached the detection area). At timing A2, step S920 is executed to turn off meandering correction (meandering non-correction execution). At timing A3 (FIG. 13 shows a state in which the splice tape 19 has passed through the detection area), S921 is executed to turn on meandering correction (meandering correction execution). Since the movement start position M of the sheet end portion position sensor is "no setting", the condition is not satisfied, and hence step S922 is not executed. Consequently, the sheet end portion position sensor 41 does not move in the sheet width direction.

(2) When (Sheet Width of Preceding Sheet)>(Sheet Width of Succeeding Sheet)

FIG. 15 is a view for explaining an example of determining the width of the meandering non-correction area 50 when the sheet width of a preceding sheet is larger than that of a succeeding sheet.

As shown in FIG. 15, start point Ns=S, end point Ne=S+Sp+D, and movement start position M of the sheet end portion position sensor=S+Sp. The width of the meandering non-correction area 50 is Sp+D, that is, (width of splice tape 19)+ (distance by which sheet is conveyed during movement of sheet end portion position sensor 41). As the sheet is conveyed, the timing at which the sheet end portion position sensor 41 detects a sheet end portion makes transition from B1 to B5. At timing B2 (in a state in which the splice tape 19 shown in FIG. 12 has reached the detection area), step S920 is executed to turn off meandering correction. At B3 (a state in which the splice tape 19 in FIG. 13 has passed through the detection area), step S922 is executed to cause the sheet end portion position sensor 41 to start moving in the sheet width direction. At B5, the sheet end portion position sensor 41 reaches a position at which an end portion of the succeeding sheet 25 can be detected and stops. At this time, the distance by which the sheet end portion position sensor 41 moves from the state at B2 to the state at B5 is about half of the difference between the sheet width of the preceding sheet and the sheet width of the succeeding sheet when the center of the preceding sheet coincides with the center of the succeeding sheet. Since B5 also coincides with the end point Ne of the meandering non-correction area, step S921 is executed to turn on meandering correction.

(3) when (Sheet Width of Preceding Sheet)<(Sheet Width of Succeeding Sheet)

FIG. 16 is a view for explaining an example of determining the width of the meandering non-correction area 50 when the sheet width of a preceding sheet is smaller than that of a succeeding sheet.

As shown in FIG. 16, start point Ns=S-D, end point Ne=S+Sp, and movement start position M of the sheet end portion position sensor=S−D. The width of the meandering non-correction area 50 is Sp+D, that is, (width of splice tape 19)+(distance by which sheet is conveyed during movement of sheet end portion position sensor 41). As the sheet is conveyed, the timing at which the sheet end portion position sensor 41 detects a sheet end portion makes transition from C1 to C5. At C2, step S920 is executed to turn off meandering correction, and at the same time, step S922 is executed to cause the sheet end portion position sensor 41 to start moving in the sheet width direction. At C3 (a state in which the splice tape 19 shown in FIG. 12 has reached the detection area), the sheet end portion position sensor 41 reaches a position at which an end portion of the succeeding roll sheet 25 can be detected and stops. At this time, the distance by which the sheet end portion position sensor 41 moves from the state at C1 to the state at C3 is about half of the difference between the sheet width of the preceding sheet and the sheet width of the succeeding sheet when the center of the preceding sheet coincides with the center of the succeeding sheet. At C4 (a state in which the splice tape 19 in FIG. 13 has passed through the detection area), step S921 is executed to turn on meandering correction.

As described above, according to the embodiment, it is possible to continue proper meandering correction without any steep change even if the splice portion passes through the sheet end portion position sensor during printing and to perform printing while reducing paper waste.

Note that in the above embodiment, the values input by the user from the operation panel 103 are used as the sheet widths of a preceding sheet and a succeeding sheet. However, the present invention is not limited to this. A sheet width sensor for detecting a sheet width may be provided, and the sheet widths detected by the sheet width sensor may be used.

In addition, in the above embodiment, the conveyance amount of a sheet is obtained from the encoder value (rotation amount) of the main conveyance rollers 12 and the roller diameter. However, the present invention is not limited to this, and the conveyance amount of a sheet may be obtained from the conveyance speed and the conveyance time of the sheet.

Furthermore, when meandering correction is turned on from the turned-off state, if the meandering amount is larger than the specified amount, printing may be stopped, and only conveyance of the sheet may be performed. When the meandering amount becomes smaller than the specified amount, the printing may be resumed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-184313, filed Nov. 17, 2022, which is hereby incorporated by reference herein in its entirety.

What is claimed is:

1. A printing apparatus that prints on sheets supplied from a rolled sheet and takes up the sheets in a roll shape, the apparatus comprising:

a splice detection unit configured to detect a splice portion of the sheets, the sheets including a preceding sheet located downstream of the splice portion and a succeeding sheet located upstream of the splice portion;

a conveyance unit configured to convey the sheets;

a meandering correction unit including a sensor unit configured to detect a sheet end portion of the sheets in a width direction of the sheets on a downstream side of the splice detection unit and configured to correct meandering of the sheets based on detection of the sheet end portion by the sensor unit;

a moving unit configured to move the sensor unit in a width direction of the sheets; and a control unit, wherein in a case in which a sheet width of the succeeding sheet is longer than a sheet width of the preceding sheet, the control unit is configured to determine a time point at which the splice portion reaches a detection area of the sensor unit based on a conveyance amount of the sheets conveyed by the conveyance unit since the splice detection unit has detected the splice portion, and to cause the moving unit to complete movement of the sensor unit by the determined time point, and wherein in a case in which the sheet width of the succeeding sheet is shorter than the sheet width of the preceding sheet, the control unit is configured to cause the moving unit to start movement of the sensor unit after the splice portion has passed the detection area.

2. The apparatus according to claim 1, further comprising:

an obtaining unit configured to obtain the sheet width of the preceding sheet and the sheet width of the succeeding sheet, wherein the moving unit is configured to move the sensor unit in a width direction of the sheets in accordance with the sheet widths obtained by the obtaining unit.

3. The apparatus according to claim 2, wherein if the sheet width of the preceding sheet and the sheet width of the succeeding sheet, which are obtained by the obtaining unit, are equal to each other, the control unit causes the meandering correction unit:

to stop correction when the splice portion reaches the detection area; and to start correction when the splice portion passes through the detection area.

4. The apparatus according to claim 3, further comprising a second obtaining unit configured to obtain a conveyance amount of the sheets, wherein the control unit determines a time point at which the splice portion reaches the detection area based on a conveyance amount of the sheets obtained by the second obtaining unit and a distance between the splice detection unit and the sensor unit.

5. The apparatus according to claim 4, wherein the second obtaining unit obtains a conveyance amount of the sheets based on a rotation amount of a conveyance roller of the conveyance unit which conveys the sheets.

6. The apparatus according to claim 4, wherein the second obtaining unit obtains a conveyance amount of the sheets based on a conveyance speed of the sheets and a conveyance time of the sheets.

7. The apparatus according to claim 2, wherein if the sheet width of the preceding sheet, which is obtained by the obtaining unit, is longer than the sheet width of the succeeding sheet, the control unit causes the meandering correction unit:

to stop correction at a time point at which the splice portion reaches the detection area; and to start correction at a timing at which the sensor unit moves to a position at which a sheet end portion of the succeeding sheet can be detected.

8. The apparatus according to claim 7, wherein a time point at which the sensor unit has moved to a position at which a sheet end portion of the succeeding sheet can be detected is determined based on a distance corresponding to substantially half of a difference between the sheet width of the preceding sheet and the sheet width of the succeeding sheet and a time required for the sensor unit to move.

9. The apparatus according to claim 8, wherein letting Vt be a target rotational speed of the moving unit, d be a total movement distance of the sensor unit which corresponds to a distance corresponding to substantially half of the sheet width difference, a be a rotational acceleration of the motor, da be an acceleration time movement amount of the sensor unit, and dd be a deceleration time movement amount of the sensor unit, a time required for the sensor unit to move in a width direction of the sheets is obtained by $$t=(Vt \div a)+((d-da-dd) \div Vt))+(Vt=d).$$

10. The apparatus according to claim 7, further comprising a second obtaining unit configured to obtain a conveyance amount of the sheets, wherein the control unit determines a time point at which the splice portion reaches the detection area based on a conveyance amount of the sheets obtained by the second obtaining unit and a distance between the splice detection unit and the sensor unit.

11. The apparatus according to claim 10, wherein the second obtaining unit obtains a conveyance amount of the sheets based on a rotation amount of a conveyance roller of the conveyance unit which conveys the sheets.

12. The apparatus according to claim 10, wherein the second obtaining unit obtains a conveyance amount of the sheets based on a conveyance speed of the sheets and a conveyance time of the sheets.

13. The apparatus according to claim 2, wherein if the sheet width of the preceding sheet, which is obtained by the obtaining unit, is shorter than the sheet width of the succeeding sheet, the control unit causes the meandering correction unit to stop correction at a time point at which the splice portion reaches the detection area, and the control unit causes the meandering correction unit to start correction at a time point at which the splice portion passes through the detection area.

14. The apparatus according to claim 13, wherein a timing before the splice portion reaches the detection area is a timing earlier than a time point at which the splice portion reaches the detection area by a time required for the sensor unit to move in a width direction of the sheet by a distance corresponding to substantially half of a difference between the sheet width of the preceding sheet and the sheet width of the succeeding sheet.

15. The apparatus according to claim 14, wherein letting Vt be a target rotational speed of the moving unit, d be a total movement distance of the sensor unit which corresponds to a distance corresponding to substantially half of the sheet width difference, a be a rotational acceleration of the motor, da be an acceleration time movement amount of the sensor unit, and dd be a deceleration time movement amount of the sensor unit, a time required for the sensor unit to move in a width direction of the sheets is obtained by $$t=(Vt \div a)+((d-da-dd)=Vt))+(Vt=d).$$

16. The apparatus according to claim 13, further comprising a second obtaining unit configured to obtain a conveyance amount of the sheets, wherein the control unit determines a time point at which the splice portion reaches the detection area based on a conveyance amount of the sheets obtained by the second obtaining unit and a distance between the splice detection unit and the sensor unit.

17. The apparatus according to claim 16, wherein the second obtaining unit obtains a conveyance amount of the sheets based on a rotation amount of a conveyance roller of the conveyance unit which conveys the sheets.

18. The apparatus according to claim 16, wherein the second obtaining unit obtains a conveyance amount of the sheets based on a conveyance speed of the sheets and a conveyance time of the sheets.

19. The apparatus according to claim 2, wherein the obtaining unit obtains a sheet width of the preceding sheet and a width sheet of the succeeding sheet which are input by a user.

20. The apparatus according to claim 2, wherein the obtaining unit obtains a sheet width of the preceding sheet and a width sheet of the succeeding sheet which are detected by a sheet width sensor.

21. The apparatus according to claim 1, wherein the control unit determines the time point based on the conveyance amount and a distance between the splice detection unit and the sensor unit.

22. The apparatus according to claim 1, wherein the control unit determines a time point at which the splice portion has passed through the detection area based on a conveyance amount of the sheet conveyed after the splice portion reaches the detection area of the sensor unit and a length of the splice portion in a conveying direction.

23. The apparatus according to claim 1, wherein the sensor unit includes a first sensor and a second sensor provided at opposing positions, and the meandering correction unit corrects meandering of the sheets by controlling conveyance of the sheets so as to always locate a sheet end portion of the sheets substantially at a center between the first sensor and the second sensor.

24. The apparatus according to claim 1, wherein the splice detection unit detects the splice portion by measuring a dimension of the sheets in a thickness direction.

25. The apparatus according to claim 1, wherein in the case in which the sheet width of the succeeding sheet is longer than the sheet width of the preceding sheet, the control unit is configured to control the moving unit so as to start movement of the sensor unit before the splice position reaches the detection area.

26. A control method for a printing apparatus that prints an image on sheets by a roll-to roll scheme, and includes a splice detection unit configured to detect a splice portion of the sheets, the sheets including a preceding sheet located downstream of the splice portion and a succeeding sheet located upstream of the splice portion, a sensor unit configured to detect a sheet end portion in a width direction of the sheets on a downstream side of the splice detection unit, and a moving unit configured to move the sensor unit in a width direction of the sheet, the method comprising:

conveying the sheets;

controlling the moving unit; and correcting meandering of the sheets based on detection of the sheet end portion by the sensor unit, wherein in a case in which a sheet width of the succeeding sheet is longer than a sheet width of the preceding sheet, in the controlling, a time point at which the splice portion reaches a detection area of the sensor unit is determined based on a conveyance amount of the sheets conveyed by the conveyance unit since the splice detection unit has detected the splice portion, and the moving unit is caused to complete movement of the sensor unit by the determined time point, and wherein in a case in which the sheet width of the succeeding sheet is shorter than the sheet width of the preceding sheet, in the controlling, the moving unit is caused to start movement of the sensor unit after the splice portion has passed the detection area.

27. The method according to claim 26, further comprising:

obtaining the sheet width of the preceding sheet located downstream of the splice portion of the sheets conveyed in the conveying and the sheet width of the succeeding sheet located upstream of the splice portion.

28. The method according to claim 27, wherein if the sheet width of the preceding sheet and the sheet width of the succeeding sheet are equal to each other, correction in the correcting is stopped at a time point at which the splice portion reaches a detection area of the sensor unit, and correction in the correcting is started at a time point at which the splice portion passes through the detection area.

29. The method according to claim 27, wherein if the sheet width of the preceding sheet is longer than the sheet width of the succeeding sheet, correction in the correcting is stopped at a time point at which the splice portion reaches a detection area of the sensor unit, and correction in the correcting is started at a timing at which the sensor unit moves to a position at which a sheet end portion of the succeeding sheet can be detected.

30. The method according to claim 27, wherein if the sheet width of the preceding sheet is shorter than the sheet width of the succeeding sheet, correction in the correcting is stopped at a timing before arrival of the splice portion at the detection region so as to complete movement of the sensor unit to a position at which a sheet end portion of the succeeding sheet can be detected at a time point at which the splice portion reaches the detection area, and correction in the correcting is started at a time point at which the splice portion passes through the detection area.

* * * * *